United States Patent
Colle et al.

(10) Patent No.: US 7,512,560 B2
(45) Date of Patent: Mar. 31, 2009

(54) AMERICAN DEPOSITARY RECEIPTS CROSSBOOK

(75) Inventors: Patrick Colle, London (GB); Joseph Dooley, Scarsdale, NY (US); Bruce Katz, Huntington, NY (US)

(73) Assignee: JPMorgan Chase Bank, New York, NY (US)

( * ) Notice: Subject to any disclaimer, the term of this patent is extended or adjusted under 35 U.S.C. 154(b) by 1270 days.

(21) Appl. No.: 10/442,999

(22) Filed: May 22, 2003

(65) Prior Publication Data

US 2003/0220869 A1    Nov. 27, 2003

Related U.S. Application Data

(60) Provisional application No. 60/382,725, filed on May 22, 2002.

(51) Int. Cl.
G06Q 40/00    (2006.01)

(52) U.S. Cl. ....................................................... 705/37
(58) Field of Classification Search .................... 705/37
See application file for complete search history.

(56) References Cited

U.S. PATENT DOCUMENTS

| | | | |
|---|---|---|---|
| 5,819,238 A | | 10/1998 | Fernholz |
| 5,873,071 A | * | 2/1999 | Ferstenberg et al. ...... 705/36 R |
| 6,418,419 B1 | | 7/2002 | Nieboer et al. |
| 7,080,050 B1 | * | 7/2006 | Himmelstein ................ 705/80 |
| 2001/0049649 A1 | | 12/2001 | Baecker et al. |
| 2002/0007338 A1 | * | 1/2002 | Do ............................... 705/37 |
| 2002/0032640 A1 | * | 3/2002 | LaFore et al. ................. 705/37 |
| 2002/0107786 A1 | * | 8/2002 | Lehmann-Haupt et al. .... 705/37 |
| 2003/0004859 A1 | * | 1/2003 | Shaw et al. .................... 705/37 |
| 2003/0061147 A1 | * | 3/2003 | Fluhr et al. ................... 705/37 |
| 2003/0163406 A1 | * | 8/2003 | Thiessen et al. ............... 705/37 |

FOREIGN PATENT DOCUMENTS

WO    WO-01/25996 A1    4/2001
WO    WO-01/59634 A2    8/2001

OTHER PUBLICATIONS

Ip, Greg (Aug. 14, 1997). Blind bids become popular in big trades. Wall Street Journal (Eastern Edition), p. C, 1:3. Retrieved Aug. 8, 2008, from ProQuest Central database. (Document ID: 13642099).*
Bartels, Carlton W., Donald B. Marron, and Michael I. Lipsky. "Clean air, clean market." Public Utilities Fortnightly 131 (1993): 14-16.*
"Acid Rain Program SO2 Allowances Fact Sheet." Clean Air Markets. EPA. Aug. 25, 2008 <http://epa.gov/airmarket/trading/factsheet.html>.*
International Search Report for PCT/US03/16000 mailed Mar. 7, 2006.

* cited by examiner

Primary Examiner—James A Kramer
Assistant Examiner—Jessica L Lemieux
(74) Attorney, Agent, or Firm—Goodwin Procter LLP (57)    ABSTRACT

A system and method for conducting ADR swaps is disclosed where ADR swap requests are read into a queue. The swap requests are then matched by security type. For example, a swap request can be made to exchange ADRs in a first security for underlying shares in the same security. The matching swap requests are then executed and the ADRs and underlying shares are exchanged.

25 Claims, 5 Drawing Sheets

| Daily | Weekly | Monthly | Custom |

| Time | Quantity | Ratio | Condition | Ref ID |
|---|---|---|---|---|
| 11:15:03 | 1500 | 3:1 | PENDING | 0003 |
| 23:03:02 | 1680 | 8:1 | PENDING | 0006 |
| 09:50:20 | 3207 | 2:3 | EXECUTED | 0007 |

AMERICAN DEPOSITARY RECEIPTS CROSSBOOK

CROSS REFERENCE TO RELATED APPLICATION

The present application claims priority to U.S. Provisional Application No. 60/382,725, filed May 22, 2002, the entirety of which is incorporated herein by reference.

FIELD OF THE INVENTION

The present invention relates to a system and method for facilitating swaps of American Depositary Receipts ("ADRs") with their corresponding underlying shares on an automated electronic system. In particular, the present system creates an electronic facility for matching and executing ADR swaps.

BACKGROUND OF THE INVENTION

An American Depositary Share ("ADS") is a U.S. dollar denominated form of equity ownership in a non-U.S. company. ADSs are quoted and traded in U.S. dollars, and are settled according to procedures governing the U.S. market. It represents the foreign shares of the company held on deposit by a custodian bank in the company's home country and carries the corporate and economic rights of the foreign shares, subject to the terms specified on the ADR certificate. ADSs can be exchanged or swapped for actual shares of the foreign stock they represent (the "underlying shares"). An American Depositary Receipt ("ADR") is a negotiable instrument evidencing ownership in one or several ADSs. The terms ADR and ADS are often used interchangeably. The ADRs can be traded on a U.S. stock exchange. ADRs make it easier for Americans to invest in foreign companies, due to the widespread availability of dollar-denominated price information, lower transaction costs, and timely dividend distributions.

Currently, the method of performing swaps of ADRs with ordinary shares is a manual process involving phone calls between brokers and various counterparties to create a swap book and then manually identifying matches within the swap book. This matching role is often called an Informal Trading Market ("ITM"). Once a match is made and the trade is executed, the trade is then settled. A trade is an exchange of securities. The ITM process allows for trades continuously throughout the day. In a traditional ITM, if there is an imbalance between the swap requests, the traditional ITM is incapable of aggregating opposing requests to create a match.

Current ITMs are manual processes facilitated by bulk emails and telephone calls. Swaps occur after a phone call from an ITM representative, a broker, dealer, or trader, is received and a swap is negotiated. This process is manually intensive and limits the availability of swap opportunities to market participants. Presently, participants are contacted based on personal relationships, market knowledge, and the like.

Figure 1:
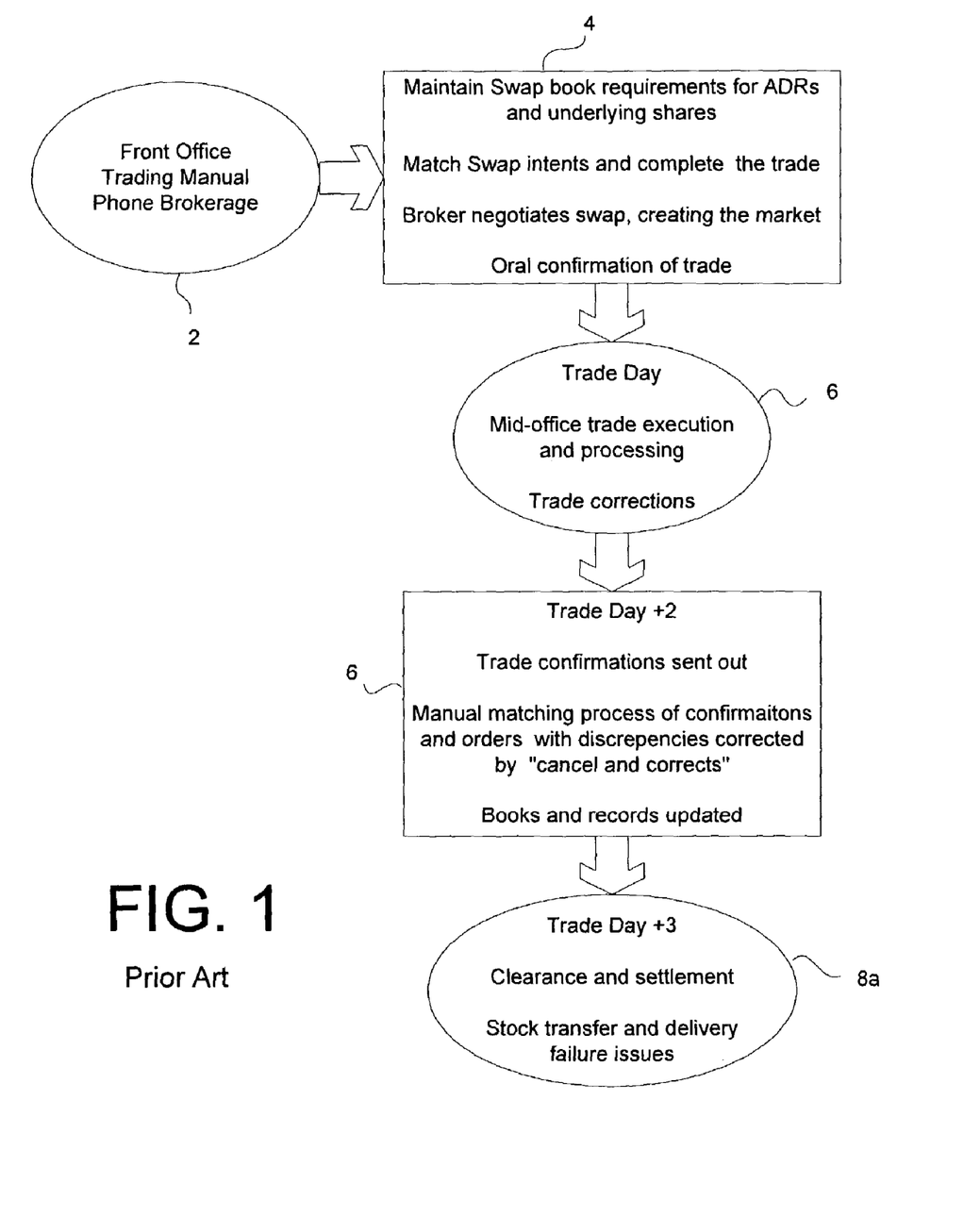
FIG. 1 is a depiction of the process according to the prior art.

As shown in FIG. 1, the front office 2 of a brokerage firm in the prior art uses a manual process as described above. The front office system 4 maintains a swap book, recording street swap requirements for both ADRs and underlying shares. Each broker negotiates the swap with counter parties effectively creating his or her own market. Oral confirmation of these trades usually takes place. Swap intents are matched and the trades are completed with the ITM broker acting as the counter party to both sides of the trade.

On the trade date, the trade is executed and processed by the mid-office (step 6). This is also when trade corrections are made. Two days after the trade date, trade confirmations are sent out to broker dealers, clearing firms and custodians. The matching process of confirmations versus known orders takes place at each institution and any discrepancies are corrected by manual clerical processes such as canceling and correcting the orders in the mid-office (step 6). Thereafter, books and records are updated at each firm. Three days after the trade date, clearance and settlement is performed 8a.

In the prior art system, the broker dealers contact counterparties telephonically to help build a swap book that enables them to create matches between holders of ADRs and holders of underlying shares.

Certain basic information comes from the traders such as whether the order is a buy, a short, or a long sell, the quantity of shares, the description of the security to be transacted, customer account information, order type and price. A trade ticket is completed and this information is passed along to the mid-office. The trades that are executed are reported to the various exchanges, such as NASDAQ and the like, and given to the back office for settlement. Transactions are cleared through an organization such as National Security Clearing Corporation ("NSCC"), Depository Trust Company ("DTC"), and local custodians which are securities clearing organizations through which brokerages clear and settle securities transactions with one another. The respective custodians are then issued instructions to deliver the shares to their respective counterparties.

In the event of an error in the transaction, such as a simple entry error, corrections are made via a manual cancel and correct process. This process requires canceling the original order and entering a corrected order. Each party corrects the trade information and updates their respective systems. Correcting an error may be as simple as updating the order management system or may be as complex as requiring that other parties and systems be updated such as those involving the transfer agents, clearing houses, custodians and the like.

Among the methods known to perform electronic trading activities is one disclosed in U.S. Pat. No. 6,418,419 to Nieboer, et al. This patent describes a method in which trading occurs directly between participants. The method does not allow for an agent to act as a broker, the trading takes place between individual participants. A trading engine performs a matching process using an external pricing feed. The trading engine disclosed by Nieboer does not allow for aggregation of swaps or the execution of trading at specific times throughout the day.

SUMMARY OF THE INVENTION

In view of the above, the present invention provides a method for electronically executing swaps between ADRs and underlying ordinary shares as well as other types of financial instruments.

In a first aspect of the invention, ADR swap requests are entered into the system and read into a queue. The swap requests are then matched by security type. For example, a swap request can be made to exchange ADRs in a first security for underlying shares in the same security. The matching swap requests are then executed and the ADRs and underlying shares are exchanged. Preferably, the matching is done using a first in, first out algorithm.

A second aspect of the invention allows swap requests to be aggregated. In this manner, a plurality of smaller swap requests can be utilized to fulfill larger swap requests.

Because the disclosed method does not entail a series of manual trades, more complete swap execution results.

BRIEF DESCRIPTION OF THE DRAWINGS

For the purposes of illustrating the present invention, the drawings show a form that is presently preferred, it being understood however, that the invention is not limited to the precise form shown by the drawing in which.

DETAILED DESCRIPTION

The disclosed system 40 is discussed as it related to swaps of ADRs for underlying shares, however the system 40 can be used to exchange other instruments such as credit derivatives, currency derivatives, wireless spectrum, energy, equity derivatives, F/X, futures, money markets, and the like. In the disclosed system 40, shown in FIG. 2, an electronic swap book is created as counterparties, i.e., trader 1, trader 2, etc., enter their swap positions, which may be proprietary trades or trades on behalf of customers. The traders can enter the swap positions via a desktop workstation or other device connected via a secure network 50 to a database 54 via front end 56. In one embodiment of the invention, the secure network is the Internet. When the secure network is the Internet, security mechanisms such as firewalls, secure log-ins, or other security mechanisms known to those skilled in the art are used. Alternatively, the traders can access the system through a Virtual Private Network ("VPN"), a dial-up system or any other telecommunication system. The ADR Crossbook Engine ("ACE") 52 accesses database 54 containing the swap positions entered by the traders and automatically matches and executes the trades.

Figure 3:
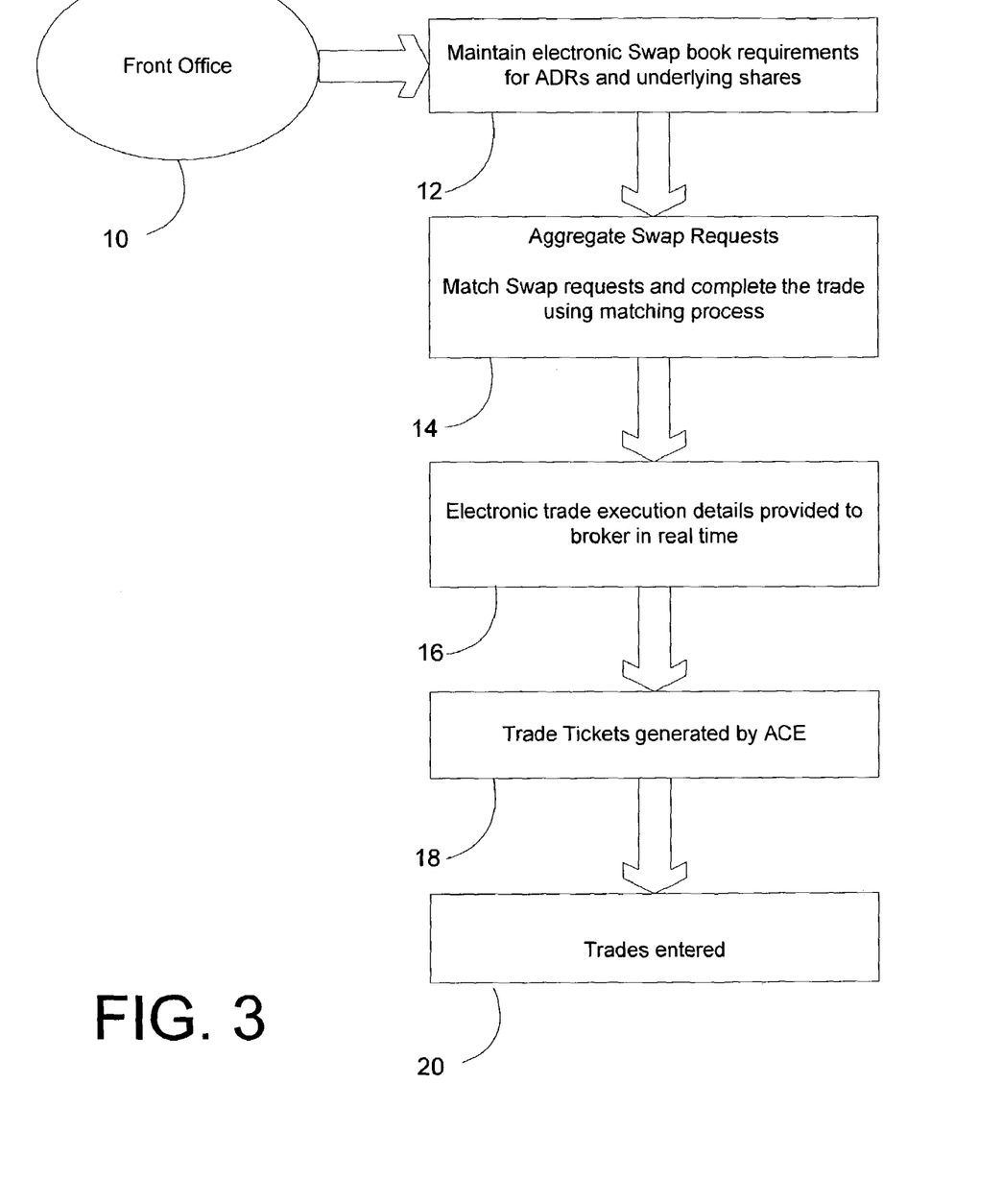
FIG. 3 illustrates the process according to one embodiment of the invention.

FIG. 3 shows a process flow chart for one embodiment of the present invention. System 40 allows clients to enter swap requests for ADRs and underlying shares in a secure confidential environment. In one embodiment of the invention, system 40 matches and executes swaps at predetermined times during the day. Thus, swap requests can be entered any time and are matched at set intervals. In this way, request aggregation is most effective. Alternately, system 40 can run whenever a full or partial match of swaps occurs. Matching is executed such that the maximum number of opposing swap orders is matched to one another.

If there is an imbalance of opposing requests, system 40 is able to aggregate the mismatched requests and match them accordingly. Because system 40 allows for aggregate matching, two outcomes are possible—all of the requests are matched resulting in total execution or a partial execution can result. If a partial execution takes place, the broker has two options, either the request can stay in system 40 for the next match or the remaining request can be deleted. In one embodiment of system 40, the non-executed requests are deleted at the end of the day.

Figure 2:
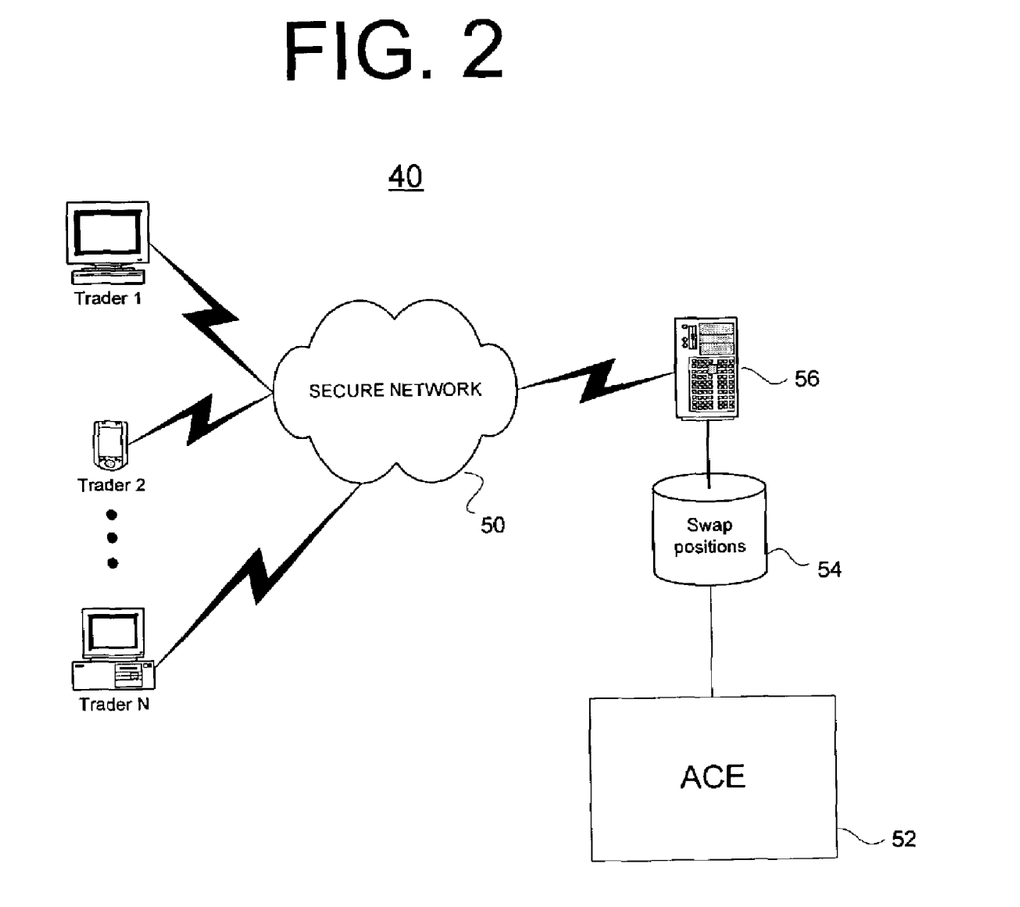
FIG. 2 is a schematic representation of the system according to one embodiment of the invention.

The process begins in the front office at step 10. To begin, a trader or customer enters a request for a swap transaction. The swap request is placed in a swap queue in ACE 52. All of the swap requests in the queue are processed at specific time intervals on a first in first out basis. At these time intervals, matches between swap requests are made and notifications are sent to each participant regarding the status of the transaction. In one embodiment of the invention, the matching process is run every hour. Alternatively, the matching process is run in real time. ACE 52 maintains an electronic swap book that records the swap requirements for both ADRs and underlying shares (Step 12). This is an automated matching system without any manual processes. The ACE 52 matches swap intents (requests) via an electronic matching process (Step 14). In one embodiment, the ACE 52 completes the trade acting as the counter party to both sides of the trade. Thereafter, electronic trade execution details are provided to the traders in real time (Step 16) and trade tickets are then automatically generated (Step 18) by ACE 52. In one embodiment of the invention, trades are then manually entered into the trader's trade management system.

ACE 52 allows for swapping in a secure, confidential environment. Because the ADRs and the underlying shares are maintained (Step 12) in an electronic swap book 54, the counterparty to each individual transactions is not known. Thus, a trader's hedge book activity is not revealed to the public. Further, automatic system 40 prevents traders from being locked out of a swap opportunity. Electronic swap book 54 also offers an additional benefit in than traders no longer have to field calls in order to create a manual swap book.

When the trade instructions are executed, system 40 can act as the counterparty or agent to the transactions. As agent, the System 40, or the operators of system 40, facilitate the exchange of the ADRs and the underlying shares and effects transfer to the appropriate parties. In this manner, system 40 acts as the intermediary through which all of the ADRs and the underlying shares pass. Once the match has been made, the trade instructions are cleared and settled. In one embodiment, a third party has the option of taking both sides of the transaction or acting on principal basis essentially matching the parties. When acting as an intermediary, ACE 52 produces four transactions—two with each party. A buy and sell to acquire and sell the ADRs as well as a buy and sell for the underlying shares. These trades are carried out by the mid-office. In one embodiment, system 40 actually purchases the ADRs and underlying shares.

Figure 4:
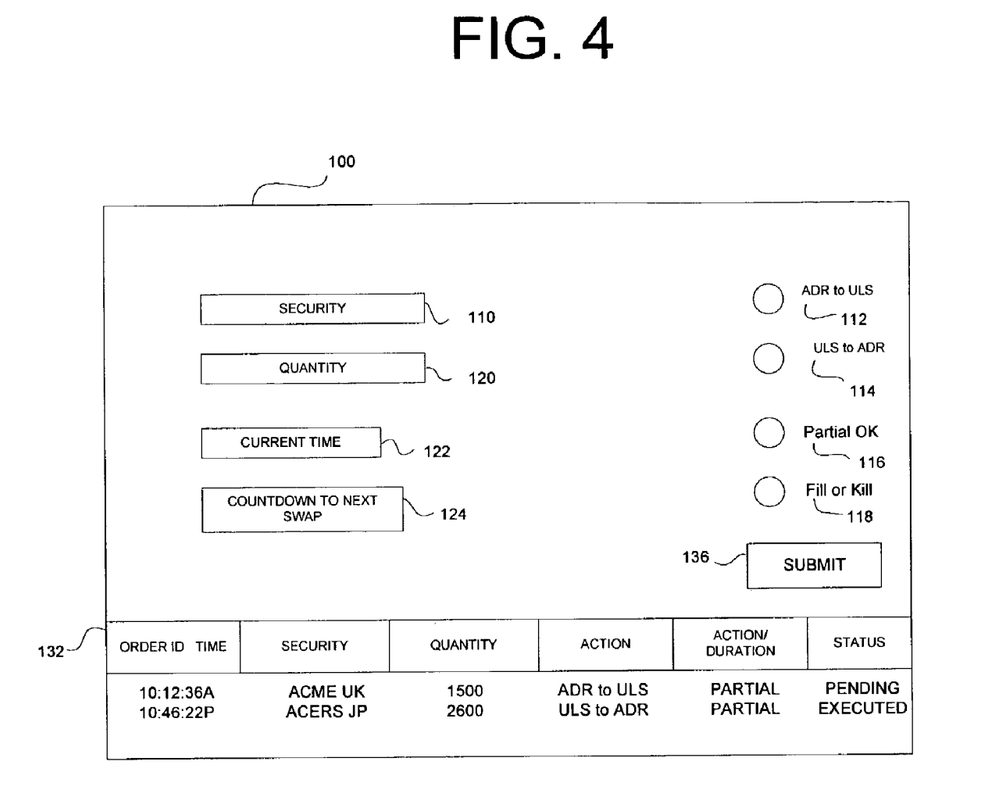
FIG. 4 is a depiction of a swap entry form according to one embodiment of the invention.

FIG. 4 is a depiction of the swap entry form used by traders according to one embodiment of the invention. The swap entry screen 100 has an area 110 where the trader enters the security to be traded by typing a security name or symbol. A pull-down menu 110 displays the most recent trades made to speed the trader's completion of the entry screen 100. The trader selects whether the swap is an ADR to underlying share 112 or underlying share to ADR 114 as well as the quantity of securities to be swapped 120. The trader also selects the final condition for the swap, such as whether or not a partial swap 116 is acceptable or whether the swap should be deleted if not completely filled 118. Finally, the current time 122 and time until the next swap will take place 124 are displayed.

Once the trader has entered all of the required information, the trader selects the submit button 136 to place the desired swap into the queue in database 54 (FIG. 2) to be processed. ACE 52 automatically attaches to the request the time the request was submitted. In one embodiment of the invention, the status of all of the trader's pending swaps is displayed on a portion 132 of the swap entry screen 100.

Figure 5:
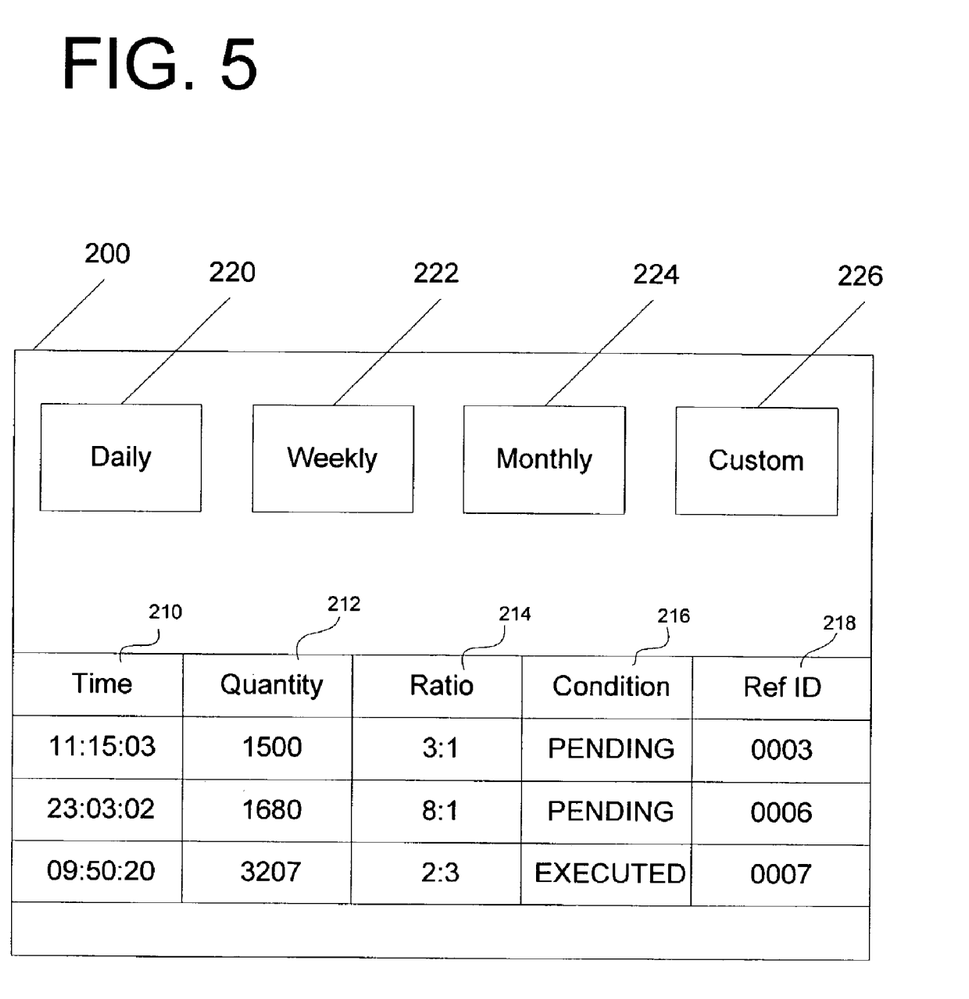
FIG. 5 shows a report form according to one embodiment of the invention.

Once the trader has entered a swap request and the swap has been executed, the trader is presented with a report screen 200 as shown in FIG. 5 showing pending and executed swaps. The report screen 200 displays the time the swap was executed 210, the quantity of shares crossed 212, the ratio of ADRs to underlying shares of the trade 214, the trade condition 216, and a reference ID 218. The reference ID 218 can be used to track pending and executed swaps. In one embodiment, the orders in the system are viewed in real-time. Additionally, the dollar value of the ADRs exchanged (not shown) is determined from the final executed ADR to underlying share ratio. In one embodiment of the invention, an indicative, notional price may be derived from a commercial pricing feed.

In one embodiment, the user can view all pending crosses. The user can then use filters to view a selection of crosses. The filters can sort by security identification number, ratio, share quantity and the like.

The report screen also allows the trader, or other user, to generate reports for other periods of time. The user can select a daily report 220, a weekly report 222, a monthly report 224, or a report generated for a custom range of dates. The reports can be printed, displayed on a computer monitor, emailed, transferred to a Personal Digital Assistant ("PDA"), or the like.

The swap logic in ACE 52 is based on the premise that share quantity and issue are the relevant matching parameters. The ADR to underlying share ratio is an independent consideration in the matching process. In one embodiment of the invention, a trader can enter a proposed ratio for the ADR or underlying share to be swapped. The matches are made by finding swap requests for ADRs and underlying shares for the same security on a FIFO basis. Thus, earlier swap requests are executed first. ACE 52 aggregates orders to complete a swap request. As trades are executed, trade tickets are produced. Swap requests are executed until there are fewer than a set number of shares remaining to be swapped. Once there are fewer than the set number of shares remaining in a swap request the request is closed. An I&C (issuance and cancellation) can then be executed to complete the request for the remaining shares. In a preferred embodiment, the minimum swap size is 1000 shares.

The swap process begins when swap requests are entered. The swap requests are ordered according to a prioritization policy. The prioritization policy uses such information as time of submission for the ordering. It should be noted that while swap requests are executed on a FIFO basis, a request for a swap for a given security will be executed as soon as a matching request is entered, i.e., in real time.

Once a match is found, based on security identification number, e.g., CUSIP, ISIN, and share quantity, an ADR conversion rate is used to determine the number of shares to apply to the swap request. The ADR conversion rate is stored in the system. If all of the shares in the request for a given security are matched, the request is marked as filled. Any shares not matched are set as pending, to be matched during the next matching cycle (preferably hourly). At the end of the hourly matching cycle, any unfilled requests are deleted if they are marked fill or kill.

When the control option "Partial OK" 116 (FIG. 4) is selected, the current request is marked partially filled as the swap request is executed. When the control option "Partial OK" 116 is not selected, the current request is only executed if it can be completed. In either case, at the end of the hourly matching cycle, any unfilled requests are deleted if they are marked fill or kill 118 (FIG. 4).

Swap requests that are not marked fill or kill are carried over into the next matching cycle. The time of entry does not change from cycle to cycle or in real time. Thus, older orders are on the swap queue with a higher priority.

The parties can negotiate a fee for the services and use of the system. The fee can be fixed or dynamically set. In one embodiment, the fee is per transaction. Alternatively, the fee is a percentage of the final transaction or based on the ratio of ADR to underlying shares and/or a usage or license fee. IN one embodiment, the fees are viewed in real-time.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A computer-implemented method of matching and executing trades of American Depositary Receipts (ADRs) and corresponding underlying shares without trader intervention, wherein an ADR represents ownership in the shares of a foreign company trading on US financial markets and corresponding underlying shares represent shares of the foreign company in that company's local market, comprising:

reading a first swap request submitted from a first trader representing a request to trade an ADR of a reference entity for corresponding underlying shares, the first swap request defining a first trading position held by the first trader;

reading a second swap request submitted from a second trader representing a request to trade an amount of shares of the reference entity for one or more corresponding ADRs, the second swap request defining a second trading position held by the second trader;

electronically matching corresponding swap requests without further trader assistance following the submission of the swap requests;

electronically executing the matched swap requests automatically after the match is made without further trader assistance following the submission of the swap requests;

wherein the identity and the first trading position of the first trader is kept confidential from the second trader and the identity and the second trading position of the second trader is kept confidential from the first trader throughout submission, matching, and execution.

2. The method according to claim 1, wherein said first swap request is for a first quantity and the second swap request is for a second quantity, the first quantity being larger than the second quantity, further comprising:

reading a third swap request submitted from a third trader representing a request to trade an amount of shares of the reference entity for one or more corresponding ADRs, the third swap request defining a third trading position held by the third trader, wherein the third swap request is for a third quantity; and aggregating the quantities of the second and third swap requests to execute the swap requests.

3. The method according to claim 1, wherein the step of executing further comprises the steps of:

transferring said ADRs of the first request to an intermediary party; and transferring said underlying shares of the second request to said intermediary party.

4. The method according to claim 1, further comprising placing said requests in a queue.

5. The method according to claim 4, further comprising prioritizing said queue according to an entry time of the swap request.

6. The method according to claim 1, further comprising executing swaps on a first in first out basis.

7. The method according to claim 1, further comprising displaying said swap requests in a sorted order.

8. A computer-implemented system for matching and executing ADR and underlying share trades without trader intervention comprising:
 a front end, said front end adapted to receive a first swap request submitted from a first trader representing an ADR of a reference entity to corresponding underlying share trade, the first swap request defining a first trading position held by the first trader, and a second swap request from a second trader representing an share of the reference entity to corresponding ADR trade, the second swap request defining a second trading position held by the second trader;
 a database for queuing the swap requests coupled to the front end;
 a crossbook engine coupled to the database;
 wherein, without further trader assistance following the submission of the swap requests, said crossbook engine matches the swap requests and automatically executes the matching swap requests after a match is made; and
 wherein the crossbook engine keeps the identity and the first trading position of the first trader confidential from the second trader and the identity and the second trading position of the second trader confidential from the first trader throughout submission, matching, and execution.

9. The system for matching and executing ADR and underlying share trades according to claim 8 further comprising:
 means for displaying said swap requests.

10. The system for matching and executing ADR and underlying share trades according to claim 8, further comprising:
 a filter for sorting the swap requests.

11. The system for matching and executing ADR and underlying share trades according to claim 8, wherein said front end is further adapted to receive a third swap request submitted from a third trader, said crossbook engine aggregating the quantity of said second and third swap requests.

12. The system for matching and executing ADR and underlying share trades according to claim 8, wherein said front end is further adapted to receive a third swap request submitted from a third trader, said crossbook engine aggregating the quantity of said first and third swap requests.

13. A computer-implemented method of matching and executing trades of American Depositary Receipts (ADRs) and corresponding underlying shares without trader intervention, wherein an ADR represents ownership in the shares of a foreign company trading on US financial markets and corresponding underlying shares represent shares of the foreign company in that company's local market, comprising:
 reading a first swap request submitted from a first trader representing a request to trade an ADR of a reference entity for corresponding underlying shares, the first swap request defining a first trading position held by the first trader;
 reading a second swap request submitted from a second trader representing a request to trade an amount of shares of the reference entity for one or more corresponding ADRs, the second swap request defining a third trading position held by the second trader;
 reading a third swap request submitted from a third trader representing a request to trade an amount of shares of the reference entity for one or more corresponding ADRs, the third swap request defining a third trading position held by the third trader;
 electronically matching corresponding swap requests without further trader assistance following the submission of the swap requests; and
 electronically executing the matched swap requests by aggregating the quantity of the second and third swap requests, without further trader assistance following the submission of the swap requests, automatically upon matching the swap requests; and
 wherein the identity and the first trading position of the first trader is kept confidential from the second and third traders, the identity and the second trading position of the second trader is kept confidential from the first and third traders, and the identity and the third trading position of the third trader is kept confidential from the first and second traders throughout submission, matching, and execution.

14. The method according to claim 13, wherein said first swap request is for a first quantity of a security and the second swap request is for a second quantity of the security, the first quantity being larger than the second quantity.

15. The method according to claim 13, wherein the step of executing further comprises the steps of:
 transferring said ADRs of the first request to an intermediary party; and
 transferring said shares of the second request and said shares of the third request to said intermediary party.

16. The method according to claim 13, further comprising placing said requests in a queue.

17. The method according to claim 13, further comprising prioritizing said queue according to an entry time of the swap request.

18. The method according to claim 13, wherein swaps are executed on a first in first out basis.

19. The method according to claim 13, wherein said swap requests are displayed in a sorted order.

20. A computer-implemented system for matching and executing ADR and underlying share trades, without trader assistance, comprising:
 a front end, said front end adapted to receive a first swap request submitted from a first trader defining a first trading position held by the first trader, a second swap request submitted from a second trader defining a second trading position held by the second trader, and a third swap request submitted from a third trader defining a third trading position held by the third trader;
 a database coupled to the front end for queuing said swap requests;
 a crossbook engine coupled to the database for, without further trader assistance following the submission of the swap requests, matching the swap requests by aggregation of the quantities of at least two swap requests and automatically executing the matching swap requests; and
 wherein the identity and the first trading position of the first trader is kept confidential from the second and third traders, the identity and the second trading position of the second trader is kept confidential from the first and third traders, and the identity and the third trading position of the third trader is kept confidential from the first and second traders throughout submission, matching, and execution.

21. The system for matching and executing ADR and underlying share trades according to claim 20 further comprising:
 means for displaying said swap requests.

22. The system for matching and executing ADR and underlying share trades according to claim 20, further comprising:

a filter for sorting the swap requests.

23. The system for matching and executing ADR and underlying share trades according to claim 20, wherein the first swap request represents an ADR of a reference entity to underlying share trade, the second swap request represents share of the reference entity to corresponding ADR trade, and the third swap request represents share of the reference entity to corresponding ADR trade, said crossbook engine executing said swap requests by aggregating the quantity of said second and third swap requests.

24. The system for executing ADR and underlying share trades according to claim 20, wherein said front end is further adapted to receive a fourth swap request submitted from a fourth trader defining a fourth trading position held by the fourth trader, wherein said crossbook engine aggregates the quantity of said first and fourth swap requests.

25. The method according to claim 13, further comprising displaying to the first trader an audit trail, said audit trail having records of the first trader's completed swap requests, and said records comprising at least one of the group consisting of time of ADR or underlying share trade, quantity of ADRs or underlying shares traded, and ADR to underlying share ratio.

* * * * *